United States Patent [19]

Yokoe et al.

[11] Patent Number: 4,823,714

[45] Date of Patent: Apr. 25, 1989

[54] ELECTRONIC CONTROLLED STITCH PATTERN SEWING MACHINE AND METHOD

[75] Inventors: Masaaki Yokoe, Nagoya; Yoshikazu Kurono, Hazu; Koji Hayashi; Tomoe Goto, both of Nagoya, all of Japan

[73] Assignee: Brother Kogyo Kabushiki Kaisha, Aichi, Japan

[21] Appl. No.: 184,097

[22] Filed: Apr. 20, 1988

[30] Foreign Application Priority Data

Apr. 24, 1987 [JP] Japan .................................. 62-102183

[51] Int. Cl.$^4$ ............................................. D05B 21/00
[52] U.S. Cl. ............................... 112/262.3; 112/266.1; 112/121.12; 112/103
[58] Field of Search ..................... 112/121.12, 103, 454, 112/266.1, 262.3, 445, 102, 78, 86, 98; 364/470

[56] References Cited

U.S. PATENT DOCUMENTS

| | | | |
|---|---|---|---|
| 4,388,884 | 6/1983 | Hirota et al. ..................... | 112/121.12 |
| 4,413,574 | 11/1983 | Hirota et al. ..................... | 112/121.12 |
| 4,622,907 | 11/1986 | Kimura ............................. | 112/121.12 |
| 4,665,846 | 5/1987 | Takano et al. .................... | 112/121.12 |
| 4,704,977 | 11/1987 | Nukushina ........................ | 112/103 X |
| 4,742,786 | 5/1988 | Hashimoto et al. ............. | 112/121.12 |

Primary Examiner—Peter Nerbun
Attorney, Agent, or Firm—Oliff & Berridge

[57] ABSTRACT

An electronic controlled stitch pattern sewing machine for sewing a desired pattern in a predetermined sewing region by automatically adjusting the size of the pattern by a simple keyboard operation. The pattern sewing machine includes first calculation means for calculating a size of a stitch pattern area, a sewing region designation means, a second calculation means for calculating a ratio of the size of the sewing region to that of the pattern area, modification means for modifying the stitch pattern data based on the ratio and control means for controlling drive means to cause relative movement between a needle and workpiece holder based on the modified stitch pattern data.

5 Claims, 6 Drawing Sheets

ELECTRONIC CONTROLLED STITCH PATTERN SEWING MACHINE AND METHOD

BACKGROUND OF THE INVENTION

1. Field of the Invention

This invention relates to an electronic controlled stitch pattern sewing machine for sewing a stitch pattern on a workpiece based on stitch pattern data previously stored in a memory.

2. Prior art

Various types of stitch pattern sewing machine have been proposed as prior arts. For example, electronic controlled stitch pattern sewing machines have been disclosed in U.S. Pat. Nos. 4,388,884 and 4,413,574. In these arts, the sewing machine is equipped with a memory device for storing stitch pattern data assigned by X-Y coordinates corresponding to each of patterns such as letters and symbols to be sewn, and is also provided with a keyboard for selecting desired patterns from the stitch pattern data stored in the memory and for determining the size and the arrangement of the selected patterns. Moreover, the sewing machine has a function to determine whether or not the arranged patterns can fit within a predetermined sewing region confined by an embroidery frame. If they do not fit within the predetermined sewing region, a warning is given to the operator in advance so that a collision between the needle and the embroidery frame can be prevented.

These prior arts, however, include some shortcomings. For the purpose of sewing operation which is sewing the stitch patterns from one end of the extent of desired sewing region to the other end thereof, the operator is required to calculate an enlargement ratio or a contraction ratio of the patterns to make the size of the patterns close to that of the desired sewing region. Moreover, in the case that a plurality of patterns are arranged to be sewn, the operator must measure the size of the stitch pattern area and calculate a modification ratio, i.e., an enlargement or a contraction ratio of the arranged patterns to make the size of the pattern area close to that of the desired sewing region.

For another type, a pattern sewing machine having a CRT display is disclosed in U.S. Pat. No. 4,622,907. In this art, the size of the embroidery frame and the arrangement of the patterns to be sewn can be shown on the CRT display. This case, however, also requires the calculation of the enlargement/contraction ratio of the patterns to match the sewn pattern to the full extent of the sewing region.

In U.S. patent application Ser. No. 932,747 (now U.S. Pat. No. 4,742,786) bearing the same assignee as the present invention, which is filed on Nov. 18, 1986 and has been allowed, a kind of automatic modification system is described. The feature of this art is seen in an optional curve which is provided by an operator. Patterns to be stitched are automatically arranged along the curve so that the patterns extend from one end of the curve to the other end. However, this prior art describes only an automatic enlargement means but makes no mention of a contraction means.

SUMMARY OF THE INVENTION

It is an object of the present invention to provide a stitch pattern sewing machine which has a function to automatically modify stitch pattern data so that the size of the stitch pattern area matches the size of a previously determined sewing region.

Another object of the present invention is to provide a stitch pattern sewing machine in which all of the operations including selection, arrangement and modification of the pattern are realized by a simple keyboard operation so that work efficiency can be highly improved.

In order to achieve those and other objects, a stitch pattern sewing machine of the invention comprises: stitch forming means including a reciprocal needle for forming a stitch on the workpiece; workpiece holding means for holding the workpiece; drive means for causing relative movement between the needle and the workpiece holding means; memory means for storing stitch pattern data of the stitch pattern to be sewn on the workpiece; first calculation means for calculating a size of a stitch pattern area which is an envelope of the stitch pattern based on the stitch pattern data stored in the memory means; designation means for designating an optional size of a sewing region on said workpiece held by said workpiece holding means; second calculation means for calculating a ratio of the size of the sewing region to the size of the stitch pattern area; modification means for modifying the stitch pattern data based on the ratio so that the size of the stitch pattern area comes close to the size of the sewing region; and control means for controlling the drive means based on the stitch pattern data modified by the modification means.

BRIEF DESCRIPTION OF THE DRAWINGS

By way of example, and to make the description clearer, reference is made to the accompanying drawings in which.

DETAILED DESCRIPTION OF THE PREFERRED EMBODIMENTS

Set forth is an explanation of a first embodiment of the present invention with reference to FIGS. 1 through 5.

Figure 2:
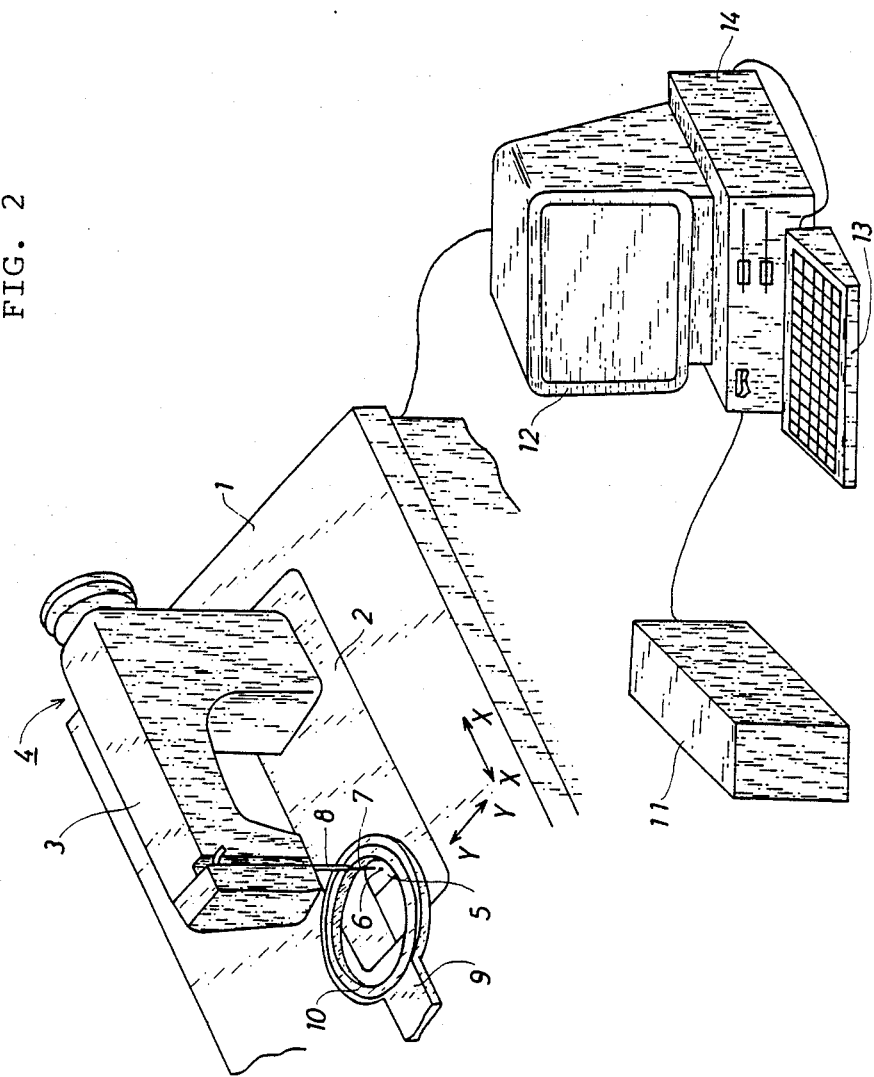
FIG. 2 is a schematic view illustrating a mechanical construction of the stitch pattern sewing machine and its peripheral equipment of the present invention.

As shown in FIG. 2, a machine body 4 including a machine bed 2 and an arm 3 is set on a machine table 1. A needle plate 5 which has a needle hole 6 in the center of the plate is provided on the machine bed 2. The upper surface of the machine bed 2 is flush with that of the machine table 1 to make a workpiece supporting surface. A needle bar 8 having a needle 7 is provided at the lower end of the machine arm 3 to be vertically movable. The needle bar 8 is actuated by the rotation of a machine motor (not shown). The needle 7 on the needle bar 8 cooperates with a loop taker (not shown) to provide the stitch forming means.

On the above-mentioned workpiece supporting surface, a workpiece holder as a workpiece holding means which is composed of an outer embroidery frame 9 (hereafter referred to as an outer frame) and an inner embroidery frame 10 (inner frame) is provided. A cloth as a workpiece is held between the outer frame 9 and the inner frame 10. The workpiece holder is moved in both X- and Y-axis directions relative to the needle 7 by driving an X-axis pulse motor 23 and a Y-axis pulse motor 24 shown in FIG. 1.

To one side of the machine table 1, there is connected a control unit 14 including: a keyboard 13 for selecting and arranging patterns and for setting a sewing region 26; a display 12 for displaying a stitch pattern, its envelope area (stitch pattern area), an input sewing region, and a maximum sewing region 25 which is confined by the inner frame 10; and an external memory 11.

Figure 1:
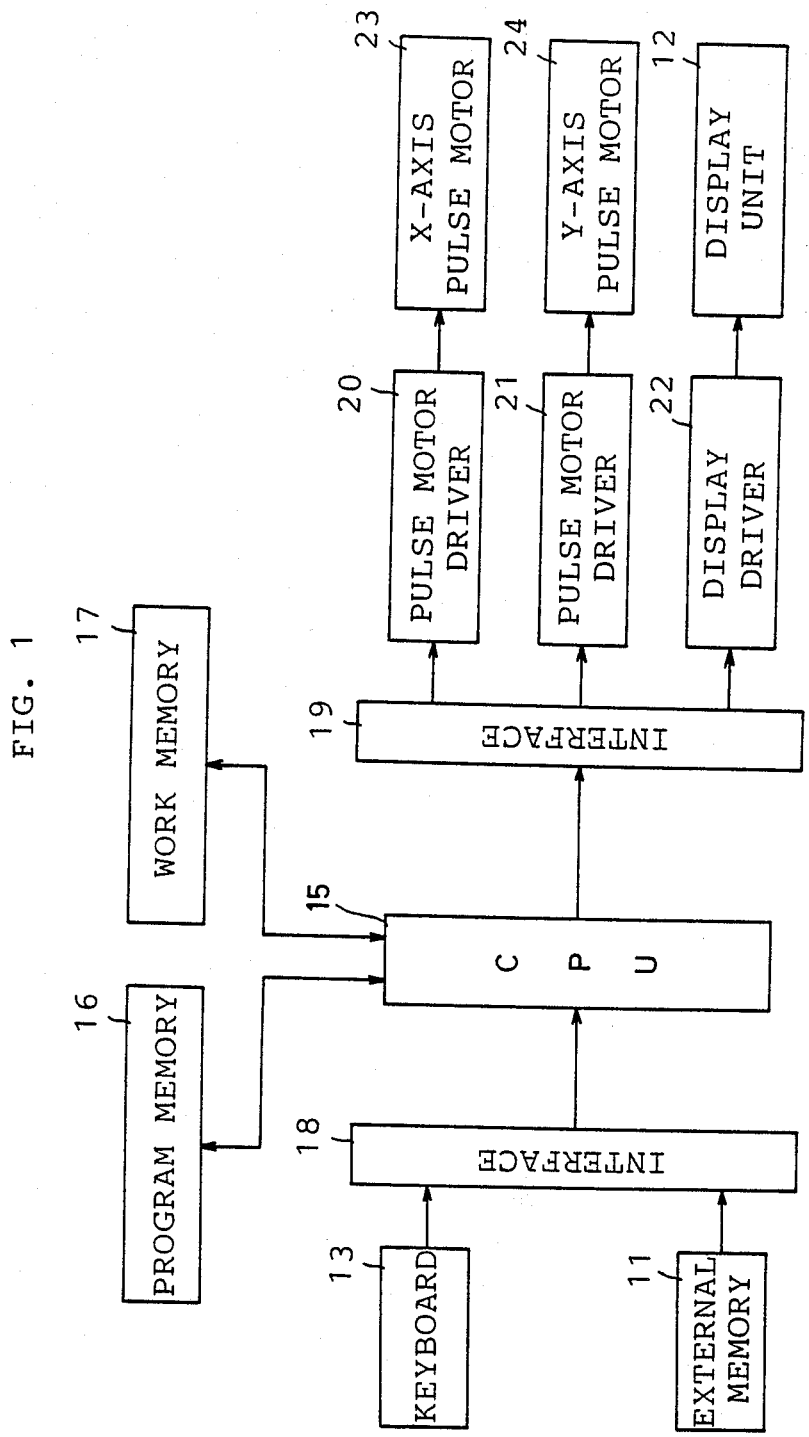
FIG. 1 is a block diagram showing an electrical construction of a stitch pattern sewing machine of the present invention.

An electrical construction of the present embodiment will be described based on FIG. 1.

A central processing unit (CPU) 15 executes various control processes as well as calculations. A program memory (ROM) 16 for storing a control program shown in the flowchart of FIG. 3 and a work memory (RAM) 17 for storing selected and arranged stitch pattern data are connected to the CPU 15.

The CPU 15 is connected via an interface 18 with the keyboard 13 and with the external memory 11. By operating the keyboard 13, signals corresponding to respective commands are transmitted to the CPU 15. The outer memory 11 stores a plurality of stitch pattern data and display data for displaying the patterns on the display 12 corresponding to each of pattern characters such as letters and symbols to be sewn. The stitch pattern data is a set of relative position data of the needle 7 with respect to the workpiece held by the workpiece holder. Each of the relative position data corresponds to one of the stitches composing a stitch pattern and is composed of an X-axis component Dx and a Y-axis component Dy.

The CPU 15 is also connected via another interface 19 with a pulse motor drivers 20 and 21 and with a display driver 22. The pulse motor drivers 20 and 21 are respectively connected with an X-axis pulse motor 23 and a Y-axis pulse motor 24. The pulse motors 23 and 24 are controlled by drive control signals generated by the CPU 15 based on the stitch pattern data. The drive means is composed of 20, 21, 23 and 24. The display driver 22 is connected with the display 12 which is actuated by display control signal generated by the CPU 15 based on the display data.

The process steps to be executed in the present embodiment will be described in detail with reference to the flowchart of FIG. 3.

At step 1 (steps are hereafter referred to as S), a pattern selection signal is input to the CPU 15 via the interface 18 by operating the keyboard 13. Then, the stitch pattern data and the display data corresponding to the pattern selection signal are read out from the external memory 11 and are transferred to the work memory 17 by the CPU 15. This process is repeated until all pattern to be sewn are selected. When all patterns are selected, the stitch pattern data and the display data corresponding to each of the selected patterns are stored in the work memory 17. Subsequently, by operating the keyboard 13, arrangement of patterns including position setting, enlargement/contraction, rotation, and so on are carried out by the operator. At this time, the arrangement command signals are transmitted via the interface 18 to the CPU 15 so that the CPU 15 modifies the stitch pattern data and the display data stored in the work memory 17 in accordance with the arrangement signals. After that, the display data corresponding to each of the pattern are read out from the work memory 17 and the CPU 15 outputs display control signal corresponding to the display data via the interface 19 to the display driver 22 so that the whole pattern area is always displayed on the display 12. When the selection and arrangement of the patterns are accomplished, the program proceeds to S2.

At S2, each stitch pattern data stored in the work memory 17 is read out by the CPU 15 so that an X-axis length Mx and a Y-axis length My of each pattern are computed on the basis of the X-axis component Dx and the Y-axis component Dy of the relative position data. Moreover, the CPU 15 calculates the size of a pattern area 27 (an envelope of the all patterns) based on the above-mentioned X-axis length Mx and Y-axis length My of each pattern. Thus, an X-axis length Lx and a Y-axis length Ly of the pattern area 27 are determined and are stored in the work memory 17. The pattern area 27 is shown on the display 12 based on the lengths Lx and Ly.

Figure 4:
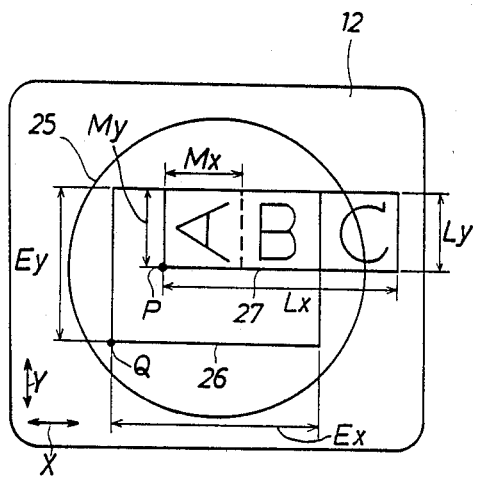
FIG. 4 shows one state of a pattern shown on a display according to the first embodiment of the present invention.

Reference is now made to FIG. 4. When a pattern "ABC", in which a letter "A" is rotated by 90° to the left, is sewn on a workpiece in the X-axis direction, the total X-axis length Lx of the pattern area 27 is calculated by adding respective X-axis lengths Mx of the characters "A", "B" and "C". The Y-axis length Ly of the pattern area 27 is determined by selecting the longest one among the Y axis lengths My of each character "A", "B" and "C". Based on the calculated X- and Y-axis lengths Lx and Ly, the pattern area 27 of the pattern ABC is shown on the display 12.

At S3, it is determined whether a sewing region setting signal composed of four vertex coordinate data is input. When the sewing region setting signal is input by operating the keyboard 13, the vertex coordinate data are stored in the work memory 17 by the CPU 15. Then, the program proceeds to S4.

At S4, the CPU 15 reads out the four vertex coordinate data of the sewing region 26 stored in the work memory 17 so as to calculate an X-axis length Ex and a Y-axis length Ey of the sewing region 26. The calculated data are stored in the work memory 17. At the same time, the sewing region 26 is shown on the display 12.

FIG. 4 illustrates a picture shown on the screen of the display 12 at S4 when the letters "A", "B" and "C" are selected to be sewn and "A" is rotated by 90° to the left at S1 and the sewing region 26 is set at S3. On the screen, a maximum sewing region 25, the pattern "ABC" to be sewn, the pattern area 27 and the sewing region 26 are simultaneously displayed. The pattern is displayed with its standard point (lower left end vertex) at the current needle position P.

At subsequent S5, the CPU 15 determines whether or not an auto-adjustment command signal is input. If the signal is input by operating the keyboard 13, the program proceeds to S6.

At S6, the X- and Y-axis lengths Lx and Ly of the pattern area 27 and the X- and Y-axis lengths Ex and Ey of the sewing region 26 are read out from the work memory 17 by the CPU 15. Based on these values, the CPU 15 calculates a ratio Rx of the X-axis length Ex of the sewing region 26 to that of the stitch pattern area 27 (Rx=Ex/Lx) and a ratio Ry of the Y-axis length of the sewing region 26 to that of the stitch pattern area 27 (Ry=Ey/Ly). The calculated ratios Rx and Ry are stored in the work memory 17, and the program proceeds to S7.

At S7, the above-calculated ratios Rx and Ry are read out from the work memory 17. In accordance with Rx and Ry, the relative position data Dx and Dy of each stitch pattern data are modified and stored in the work memory 17. The modification accords with the equations Dx=Rx·Dx and Dy=Ry·Dy, respectively. At this step, the X- and Y-axis lengths of the pattern area 27 become equal to those of the sewing region 26. Namely, Lx=Ex and Ly=Ey. Moreover, the display data are also modified based on the above-mentioned ratios Rx and Ry.

Figure 5:
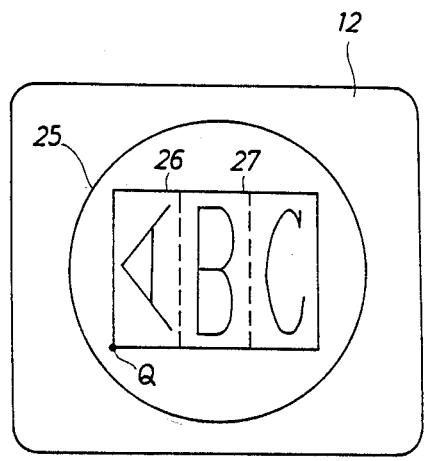
FIG. 5 illustrates another state of a pattern shown on a display in the first embodiment.

At S8, the coordinates of the current position P of the needle and those of the lower left end vertex Q of the sewing region are compared by the CPU 15. Then, a distance Sx in the X-axis direction and a distance Sy in the Y-axis direction between the points P and Q are calculated and stored in the work memory 17. The modified pattern is shown on the display 12 with the standard point at the point Q. As a result of the modification and the movement, the picture on the display 12 shown in FIG. 4 is changed as shown in FIG. 5. Namely, the pattern area 27 matches the sewing region 26 and the pattern "ABC" is modified by contracting in the X-axis direction and extending in the Y-axis direction.

At subsequent S9, the CPU 15 determines whether or not a sewing command signal is input from the keyboard 13. If YES, the program proceeds to S10.

At S10, the distances Sx and Sy between the current needle position P and the standard point Q in both X- and Y-axis directions are read out from the work memory 17. The pulse motors 23 and 24 are actuated in accordance with the distances Sx and Sy so that the embroidery frame 9 is moved in the X- and Y-axis directions to bring the standard point Q (lower left end vertex of the sewing region) to the current needle position P. Then at S11, the machine 4 is driven and tee CPU 15 drives the pulse motors 23 and 24 according to the modified stitch pattern data. Thus, the pattern "ABC" shown in FIG. 5 is sewn on the workpiece.

In the present embodiment, since the maximum sewing region 25, the sewing region 26, the stitch pattern area 27 and the pattern to be sewn are simultaneously shown on the display 12, the operator can easily recognize the stitching position of the pattern.

Figure 6:
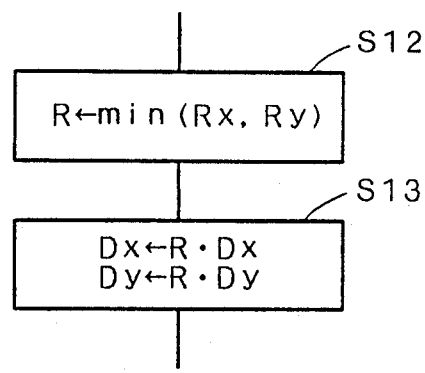
FIG. 6 is a flowchart of a pattern modification process according to a second embodiment of the present invention.

Next, the second embodiment of the present invention will be described with reference to FIGS. 6 through 8.

The electrical and mechanical construction of the stitch pattern sewing machine of the second embodiment is the same as that of the first embodiment. The difference is seen in the flowchart of FIG. 3. Namely, S12 and S13 of FIG. 6 are substituted for S7 of the first embodiment.

Figure 3:
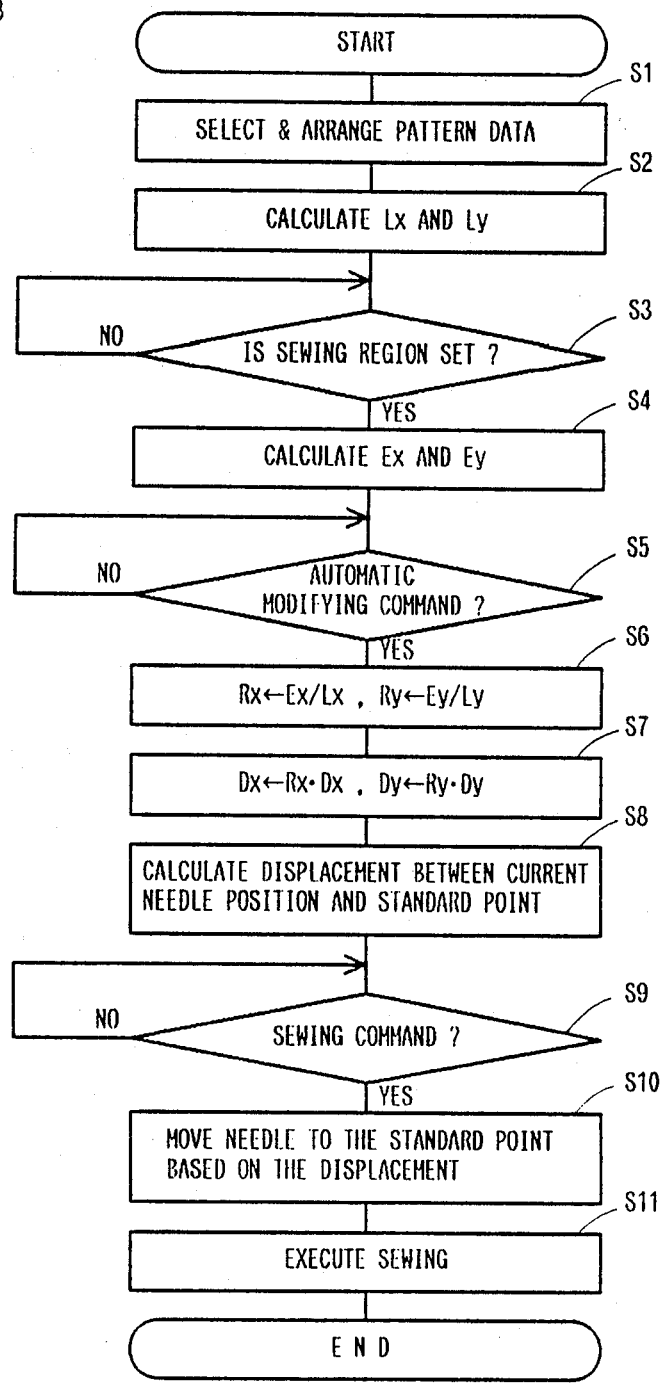
FIG. 3 is a flowchart of a pattern modification routine to be executed in a first embodiment of the present invention.

In FIG. 3, after the ratios Rx and Ry are calculated at S6, the program proceeds to S12 in the second embodiment. At S12, the ratios Rx and Ry are read out from the work memory 17 to be compared with each other. Here the smaller one is selected as a modification ratio R and is stored in the work memory 17. Then, the program proceeds to S13.

At S13, each pattern stitching data and the modification ratio R are read out from the work memory 17. Based on the ratio R, the relative position data Dx and Dy for each of the stitch pattern data are modified in accordance with the equations Dx=R·Dx and Dy=R·Dy. The modified data are stored in the work memory 17. At this step, either the X- or the Y-axis length of the pattern area 27 becomes equal to the length of the corresponding axis of the stitching region 26. As a result, the figure of the pattern is adjusted to remain similar to the one arranged at S1. Moreover, the display data is also modified based on the modification ratio R. After the execution of S12 and S13, the program proceeds to S8 and the steps S9 through S11 follow as in the first embodiment.

Figure 7:
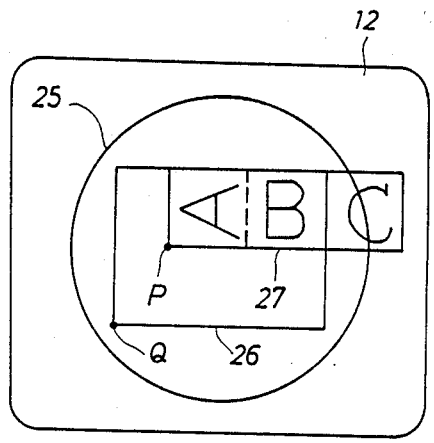
FIG. 7 shows one state of a pattern shown on a display according to a second embodiment of the present invention.
Figure 8:
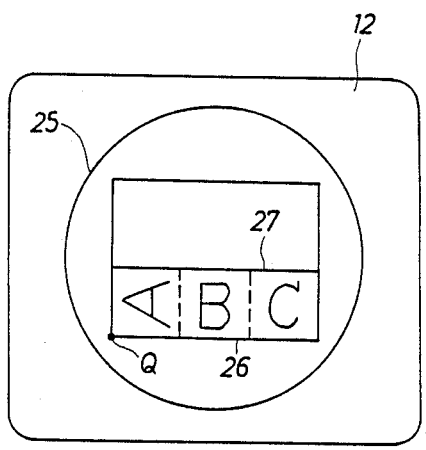
FIG. 8 illustrates another state of a pattern shown on a display in the second embodiment of the present invention.

The pictures on the display 12 at S4 and at S8 are respectively shown in FIGS. 7 and 8. Namely, FIG. 7 illustrates the figure of the pattern before the auto-adjustment command is input by the operator. FIG. 8 shows the modified figure of the pattern.

As is apparent from FIG. 8, only the X-axis length of the pattern area 27 is equal to that of the sewing region 26, because the ratio Rx is smaller than the ratio Ry so that Rx is selected as the modification ratio R. Since the modification ratio R is common in X- and Y-directions, the figure of the original pattern "ABC", as shown in FIG. 7, remains similar to that after modified, as shown in FIG. 8.

In the second embodiment, since the ratio Rx of the X-axis length of the pattern area 27 to that of the sewing region 26 and the ratio Ry of the Y-axis length of the pattern area 27 to that of the sewing region 26 are compared and smaller one is selected as the modification ratio R, the pattern is automatically modified so that the modified pattern remains similar to the original pattern and can fit within the sewing region 26.

While the invention has been particularly shown and described with reference to two preferred embodiments, it will be understood by those skilled in the art that various other changes in form and detail may be made without departing from the spirit and scope of the invention. For example, the form of the sewing region may be set other than a rectangle, e.g., a circle and so on. Moreover, while the present invention is embodied by an electronic controlled stitch pattern sewing machine, it may be embodied by other types of automatic pattern sewing machines.

What is claimed is:

1. A stitch pattern sewing machine for sewing a stitch pattern on a workpiece comprising:
    stitch forming means including a reciprocal needle for forming a stitch on the workpiece;
    workpiece holding means for holding the workpiece;
    drive means for causing relative movement between the needle and the workpiece holding means;
    memory means for storing stitch pattern data of the stitch pattern to be sewn on the workpiece;
    first calculation means for calculating a size of a stitch pattern area (27) which is an envelope of the stitch pattern based on the stitch pattern data stored in the memory means;
    designation means for designating an optional size of a sewing region on said workpiece held by said workpiece holding means;

second calculation means for calculating a ratio of the size of the sewing region to the size of the stitch pattern area;

modification means for modifying the stitch pattern data based on the ratio so that the size of the stitch pattern area comes close to the size of the sewing region; and control means for controlling the drive means based on the stitch pattern data modified by the modification means.

2. The stitch pattern sewing machine according to claim 1, wherein:

the stitch pattern data is defined by X-Y coordinates;

the first calculation means calculates a maximum X-directional length and a maximum Y-directional length of an extent of the stitch pattern area;

the designation means designates a maximum X-directional length and a maximum Y-directional length of an extent of the sewing region;

the second calculation means calculates an X-directional ratio which is a ratio of the maximum X-directional length of the extent of the sewing region to that of the stitch pattern area and a Y-directional ratio which is a ratio of the maximum Y-directional length of the extent of the sewing region to that of the stitch pattern area; and the modification means modifies the stitch pattern data by multiplying an X-component of the stitch pattern data by the X-directional ratio and multiplying a Y-component of the stitch pattern data by the Y-directional ratio.

3. The stitch pattern sewing machine according to claim 1, wherein:

the stitch pattern data is defined by X-Y coordinates;

the first calculation means calculates a maximum X-directional length and a maximum Y-directional length of an extent of the stitch pattern area;

the designation means designates a maximum X-directional length and a maximum Y-directional length of an extent of the sewing region;

the second calculation means comprises means for calculating an X-directional ratio which is a ratio of the maximum X-directional length of the extent of the sewing region to that of the stitch pattern area and a Y-directional ratio which is a ratio of the maximum Y-directional length of the extent of the sewing region to that of the stitch pattern area and means for determining a modification ratio which is the smaller one of the X-directional ratio and the Y-directional ratio; and the modification means modifies the stitch pattern data by multiplying an X-component of the stitch pattern data by the modification ratio and multiplying a Y-component of the pattern stitch data by the modification ratio.

4. The pattern stitching machine according to claim 1, wherein the stitch pattern sewing machine further comprises a display for displaying the stitch pattern and the sewing region simultaneously.

5. A method for sewing a stitch pattern in a desired sewing region of a workpiece by a sewing machine having a reciprocal needle, workpiece holding means and drive means for causing relative movement between the needle and the workpiece holding means, the method comprising steps of:

making stitch pattern data of the stitch pattern to be sewn on the workpiece;

determining a size of a stitch pattern area which is an envelope of the stitch pattern based on the stitch pattern data;

determining a size of the sewing region;

calculating a ratio of the size of the sewing region to the size of the stitch pattern area;

modifying the stitch pattern data based on the ratio so that the size of the stitch pattern area comes close to the size of the sewing region; and controlling the drive means based on the modified stitch pattern data.

* * * * *